United States Patent Office 3,510,042
Patented May 5, 1970

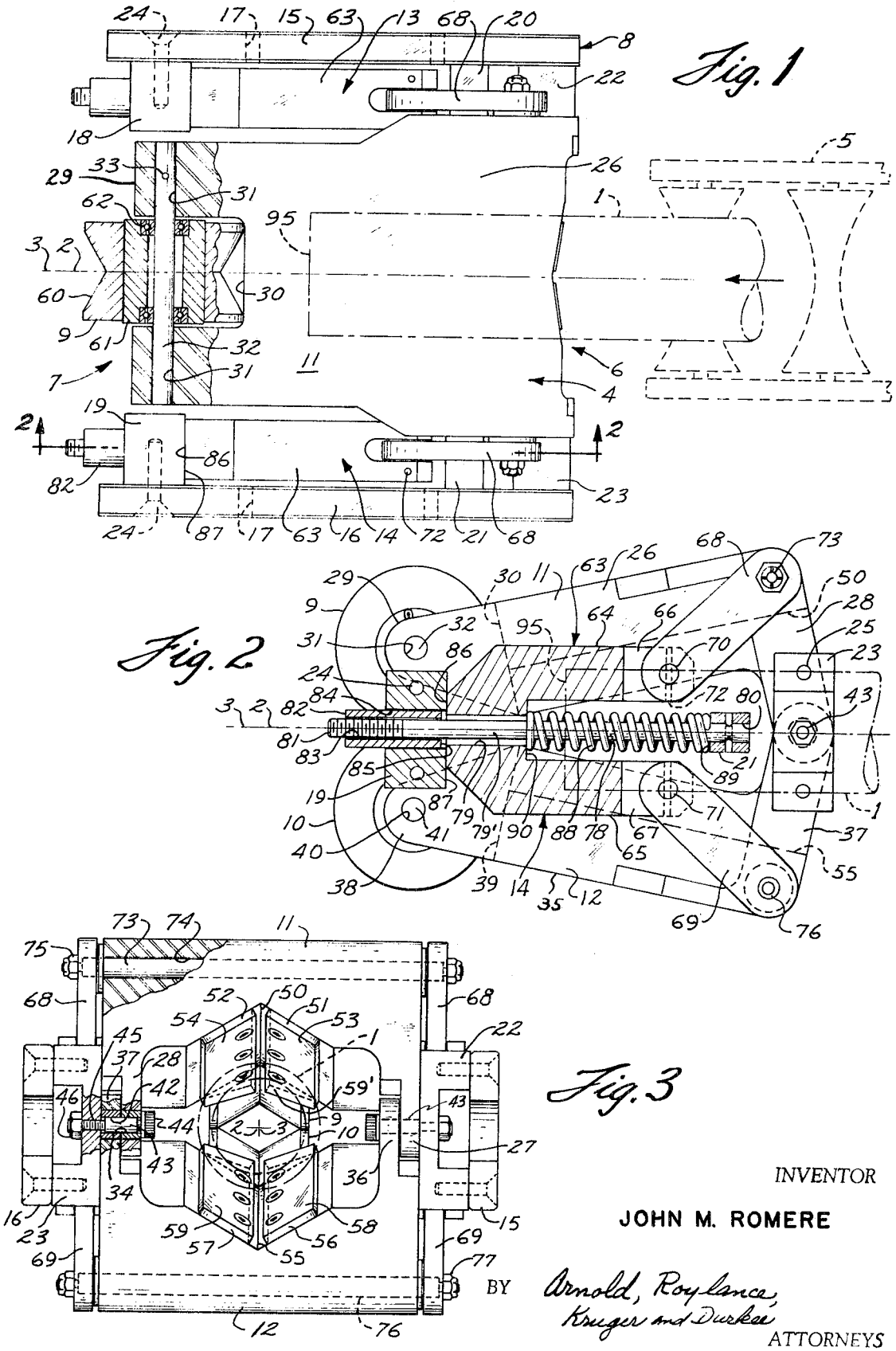

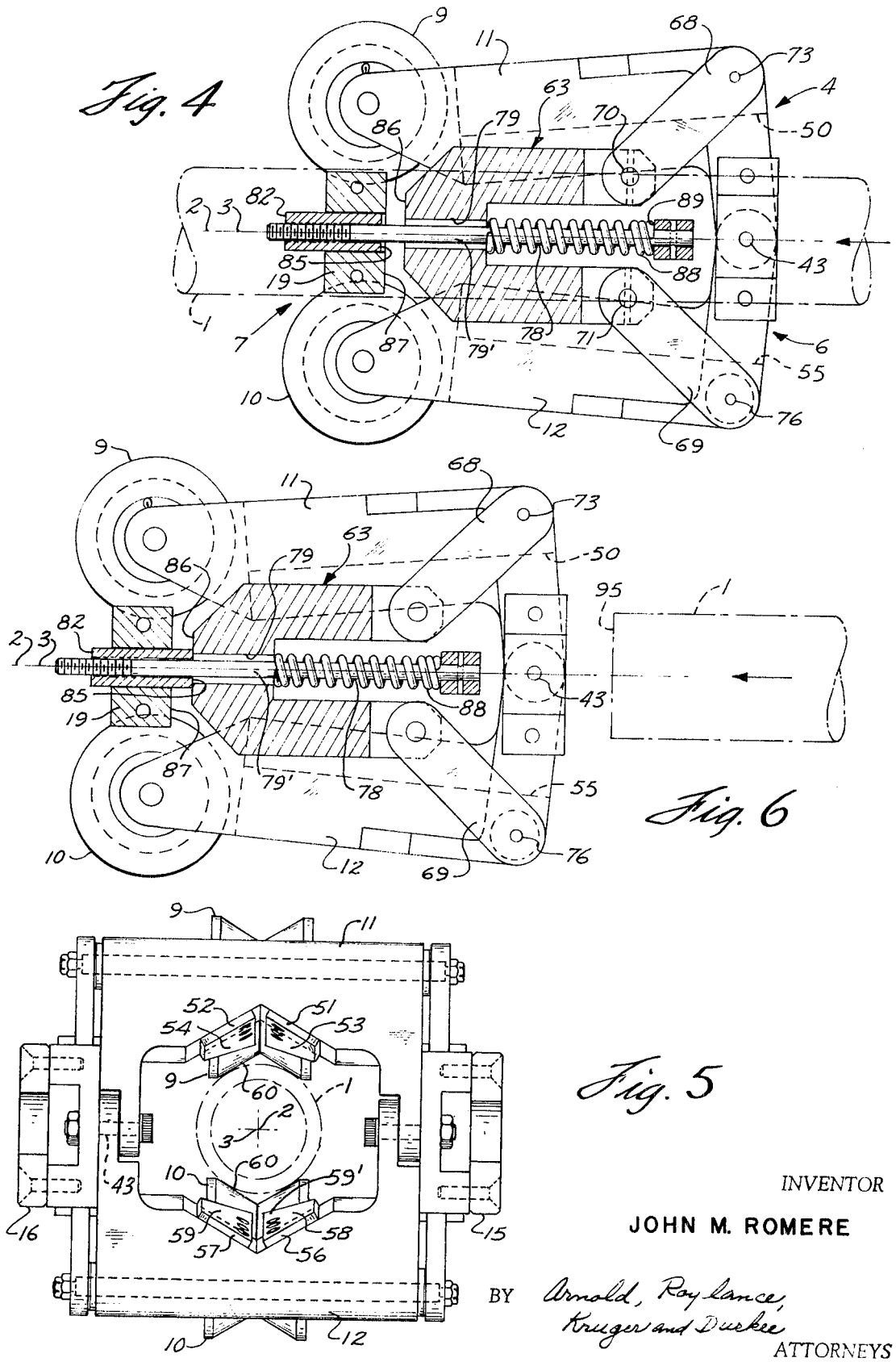

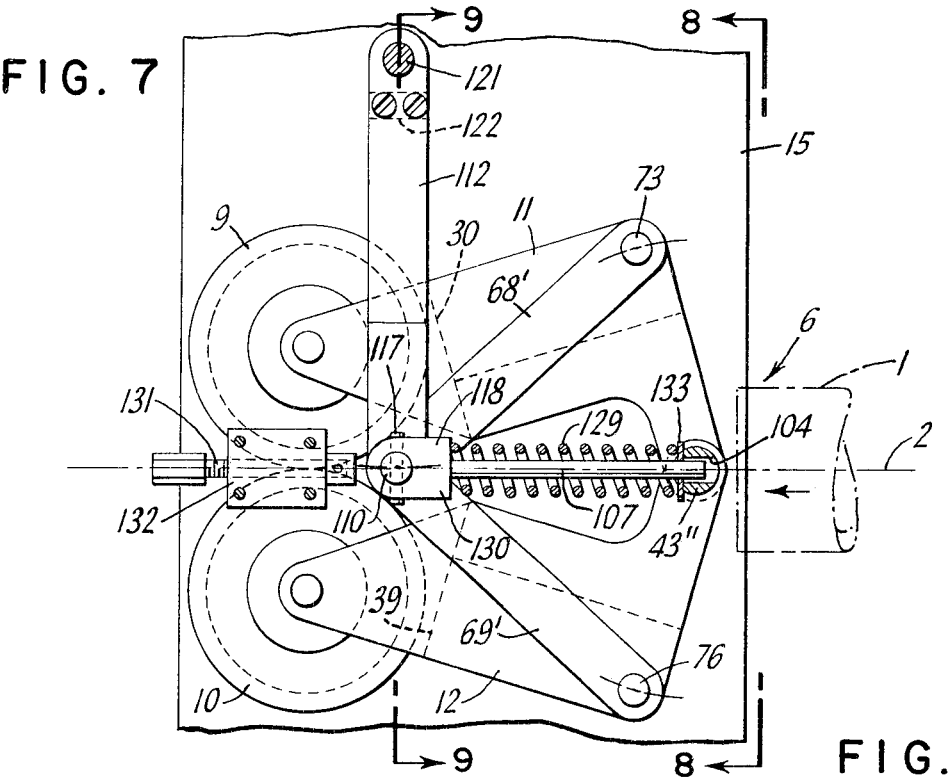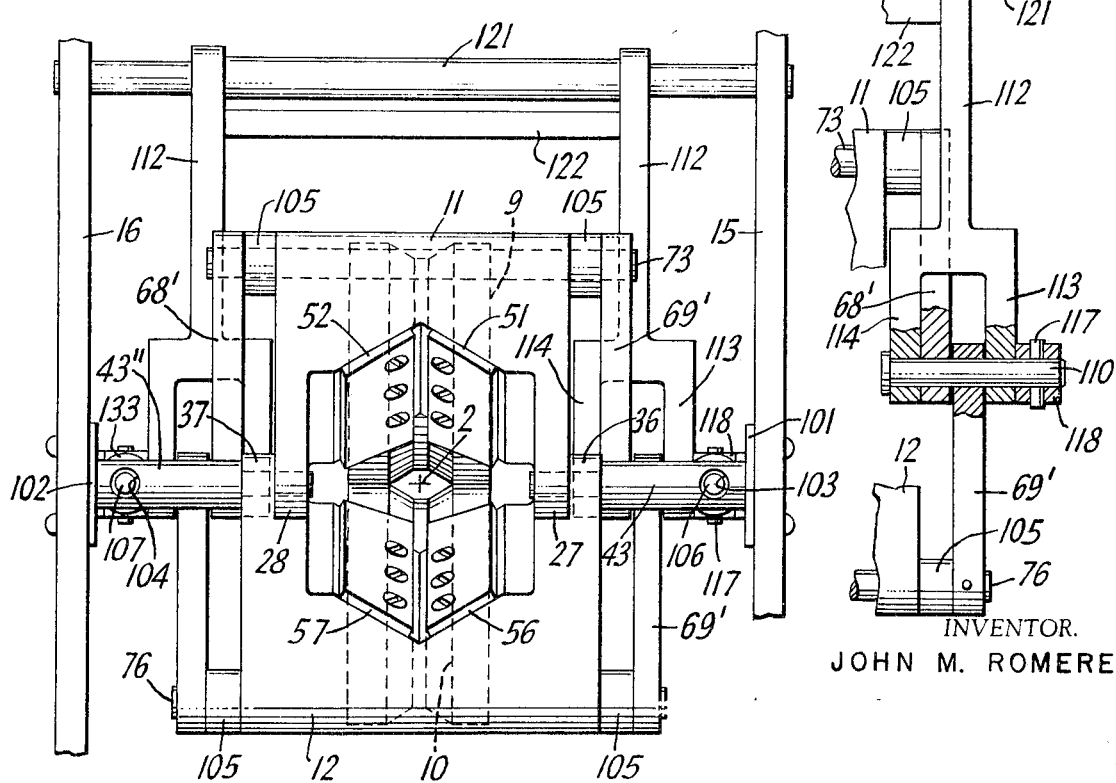

3,510,042
ALIGNING DEVICE
John M. Romere, Houston, Tex., assignor to American Machine & Foundry Company, New York, N.Y., a corporation of New Jersey
Continuation-in-part of application Ser. No. 614,194, Feb. 6, 1967. This application Apr. 3, 1969, Ser. No. 822,798
Int. Cl. B65h 17/20
U.S. Cl. 226—177
21 Claims

ABSTRACT OF THE DISCLOSURE

A device to center a longitudinally traveling object, particularly a pipe to be nondestructively tested, and to guide same along a predetermined path. Guide rollers are mounted on arms interconnected for simultaneous pivotal movement toward and away from the pipe, and a spring urges the rollers toward the pipe. A pipe entering the device engages members on the arms to move the rollers apart a distance approximately equal to the diameter of the pipe. An adjusting device permits setting the rollers apart for a pipe of a certain diameter, to reduce wear, when many lengths of like diameter pipe are to be aligned.

SUMMARY OF THE INVENTION

This application is a continuation-in-part of copending application Ser. No. 614,194, entitled "Aligning Device," filed Feb. 6, 1967, now abandoned by John M. Romere.

The invention relates to a device for centering an object and guiding the object along a predetermined path of travel.

More specifically, the invention relates to a device of particular utility for aligning and guiding a longitudinally traveling pipe for nondestructive testing by, for example, ultrasonic or magnetic test apparatus.

In one for of nondestructive testing of objects, such as well pipe, the test apparatus is stationary and the pipe is propelled through the test apparatus at a rapid rate. A speed of 500 feet per minute for the pipe is not uncommon. To obtain accurate test results the pipe (or other object) must travel along a predetermined centered path relative to the test apparatus. The present invention accurately aligns traveling objects, such as pipe, for movement along such a predetermined path.

Well known in the art are pipe guides and aligning devices of the type which include a first roller and a second roller mounted in opposed coplanar relation to each other in a manner similar to the wringer rollers of old style clothes washing machines. These guide rollers of the prior art, are normally V-grooved and are independently spring biased into engagement with a pipe passing between the rollers. A pipe entering the rollers forces the rollers outwardly, and the separate spring forces function to ultimately align the pipe and guide same along a predetermined path. When a misaligned pipe engages the rollers, one roller is deflected more than the other roller and the spring of the deflected roller operates to return the roller and the pipe to a normal position in which the pipe is centered. However, as the deflected roller moves away from its centered position, the other roller moves in the same direction because of the action of its spring. Hence, the force of the spring of the deflected roller must overcome not only the inertia of the pipe but in addition the opposing spring force of the other roller.

One prior solution to this problem of the prior art guide rollers is to fix one roller against movement transversely of the path of the pipe and spring urge the other roller toward the pipe. This arrangement, however, is not really satisfactory because, first, rapid wear of the fixed roller occurs, and second, the fixed roller must be repositioned for each different diameter of pipe which is aligned, to maintain the center of the pipe along the predetermined path.

Applicant's invention overcomes the shortcomings of the prior art guides and aligning devices. In applicant's device, the pipe engaging rollers are interconnected for movement simultaneously toward and away from the predetermined path of travel of the object to be aligned. Where the device is used to align a pipe, the rollers are each V-grooved to enhance the guiding function, and are each spring urged toward the pipe to engage its outer surface and maintain the pipe axis along the desired path of travel. With this arrangement, pipes of various different diameters can be accurately aligned and centered for movement along the perdetermined path. A misaligned pipe which deflects one roller outwardly, causes the other roller to likewise move outwardly and hence, the entire spring force is utilized to return the pipe to the desired predetermined path of travel without opposition from the other roller.

In the preferred arrangement, a spring is operatively connected to the arms on which the rollers are mounted to urge the rollers against the pipe. In addition, a unique adjusting arrangement is included, whereby, the spacing of the rollers can be preset so the space therebetween is only slightly less than the diameter of a pipe to be aligned, and thus, wear on the rollers and the other parts of the aligning device is substantially reduced.

The aligning device of this invention also includes pipe engaging members positioned to be engaged by the leading end of a pipe before the end reaches the rollers. These members are mounted on the same arms which support the rollers with the result that the rollers are spread, by an object entering the device, to approximately the proper distance apart to receive the traveling pipe. The members also serve to prealign a badly misaligned pipe and thus prevent excessive wear of and damage to the rollers.

In addition to the advantages mentioned above, the aligning device of this invention is reliable, inexpensive to manufacture, and automatically accommodates itself to align pipes of different and nonuniform diameters. Hence, successive lengths of pipe of different diameters can be fed to the aligning device without adjusting same, and pipe with enlarged sections such as upset coupling ends is also readily aligned.

Numerous other features and advantages will become apparent with reference to the drawings, which form a part of the specification, and in which:

FIG. 1 is a top plan view of the aligning device of this invention with portions thereof cut away for purposes of illustration;

FIG. 2 is a front elevational view in section taken along line 2—2 of FIG. 1;

FIG. 3 is a right-hand end view of the aligning device of FIG. 1;

FIG. 4 is a view corresponding to FIG. 2 but showing the parts of the aligning device in the positions they occupy when a pipe is between the pipe engaging rollers;

FIG. 5 is a view corresponding to FIG. 3 but showing the parts of the aligning device in the same position as FIG. 4 when a pipe is between the pipe engaging rollers;

FIG. 6 is a view corresponding to FIG. 2 but with the parts of the aligning device in an adjusted position so that the spacing between the pipe engaging rollers is only slightly less than the diameter of a pipe to be aligned;

FIGS. 7 and 8 are, respectively, side and front views of an alternative embodiment of the invention; and FIG. 9 is an illustration of a portion only of the device illustrated in FIGS. 7 and 8 and shows the details of the pivot connections associated with connecting links of the device.

Referring now to the drawings in detail and particularly to FIGS. 1–3, a preferred embodiment of the invention will be described as employed to center and guide a longitudinally travelling length of pipe 1 so its axis is aligned with a predetermined, horizontal straight line path 2 represented by center line 3. Pipe 1 is propelled toward the aligning device 4 on a conveyor 5 (shown in dotted lines since it forms no part of the invention) located ahead of inlet end 6 of the aligning device. The pipe travels through the aligning device 4 from inlet end 6 to an outlet end 7 of the aligning device 4. The center line 3 is typically the center line of a nondestructive test apparatus (not shown) located beyond outlet end 7 of the aligning device. Additional aligning devices like aligning device 4 may be positioned along center line 3, for example, at locations ahead of or beyond aligning device 4, or at the end of the nondestructive test apparatus opposite aligning device 4.

Aligning device 4 includes a support indicated generally at 8, first and second object engaging members in the form of rollers 9 and 10, mounting members in the form of arms 11 and 12 pivotally mounted on support 8, and connecting mechanisms 13 and 14 which mechanically interconnect arms 11 and 12 for simultaneous movement toward and away from predetermined path 2. As will be noted with reference to the drawings, aligning device 4 is symmetrical about both the horizontal plane in which center line 3 lies and the vertical plane in which center line 3 lies.

Support 8 includes flat elongated support plates 15 and 16 at opposite sides of aligning device 4. Support plates 15 and 16 are equidistantly spaced on opposite sides of predetermined path 2, lie in opposed parallel relation to each other, and are parallel to path 2. Each of support plates 15 and 16 is provided with suitable openings 17 to receive bolts (not shown) to fix the aligning device to a suitable supporting structure (not shown) in the proper position relative to predetermined path 2.

Fixed to and extending inwardly from support plates 15 and 16 are mounting blocks 18–23. Mounting blocks 18 and 19 are fixed respectively to support plates 15 and 16 with screws 24. Mounting blocks 18 and 19 are identical and are transversely aligned to predetermined path 2. Mounting blocks 20 and 21 are identical and are secured to support plates 15 and 16 respectively with suitable screws (not shown) and are aligned with each other transversely of predetermined path 2. Mounting blocks 22 and 23 are identical, are fixed to support plates 15 and 16 respectively with suitable screws 25 (FIG. 2), and are aligned with each other transversely of predetermined path 2. With reference to FIG. 1, it will be observed that mounting blocks 18 and 19 are located adjacent outlet end 7 of aligning device 4, mounting blocks 22 and 23 are located adjacent inlet end 6, and mounting blocks 20 and 21 are offset in a direction toward inlet end 6.

Arms 11 and 12 are identical to each other and are each elongated in a direction parallel with predetermined path 2 and longitudinally of aligning device 4. Arm 11 has a relatively thick elongated body portion 26 and a pair of spaced apart parallel integral ears 27 and 28 (FIG. 3) which project perpendicularly from one end of the body portion and extend on opposite sides of predetermined path 2. At the opposite end of arms 11, body portion 26 is provided with a rounded nose 29 (FIG. 2) which has a U-shaped recess 30 (as best seen at FIG. 1), extending therethrough at a location midway between the sides of arm 11. The portions of nose 29 on opposite sides of recess 30 have aligned transversely extending bores 31 to receive an axle 32 which is fixed to arm 11 by a cotter pin 33. Ears 27 and 28 are each provided with aligned bores 34 (as shown at FIG. 3 for ear 28) which provide bearings for pivotally mounting arm 11.

Arm 12 is identical to arm 11 and includes an elongated body portion 35 with ears 36 and 37 projecting perpendicularly therefrom, at one end, and a nose 38 at the other end having a recess 39, the nose having aligned transversely extending bores 40 to receive axle 41 which is fixed to arm 12 by a cotter pin (not shown). Ears 36 and 37 have aligned bores 42 which provide bearings for pivotally mounting arm 12.

Fixed to mounting blocks 22 and 23 and projecting inwardly therefrom are short pivot pins 43 each having an enlarged head 44. Each pivot pin 43 also has a reduced diameter threaded tip 45 to receive a nut 46 to fix the pivot pin to the respective one of mounting blocks 22, 23. Pivot pins 43 are so mounted on mounting blocks 22 and 23 respectively that the axes of the pivot pins are aligned with each other and are perpendicular to predetermined path 2.

As shown at FIG. 3, pivot pins 43 extend through bores 34 of ears 27 and 28 to pivotally mount arm 11 on support 8, and extend through bores 42 of ears 36 and 37 to pivotally mount arm 12 on support 8. Since the axes of pins 43, about which arms 11 and 12 pivot, each is perpendicular to predetermined path 2, it correspondingly may be said that arms 11 and 12 each pivot about axes in the same plane perpendicular to predetermined path 2. The axis of pivot pins 43 is parallel with and equidistantly spaced from the axis of each of axles 32 and 41. With the arms mounted for pivotal movement as shown at FIG. 2, the axis of axle 32 is perpendicular to a line normal to predetermined path 2, and the axis of axle 41 is perpendicular to a line normal to predetermined path 2.

It will be observed with reference to FIGS. 2 and 3 that body 26 of arm 11 has a V-shaped recess 50 formed therein which faces toward path 2 and extends longitudinally from recess 30 to the end of the arm adjacent inlet end 6. Recess 50 is symmetrical about the vertical plane in which predetermined path 2 lies. Replaceably fixed to the surfaces of V-shaped recess 50 are flat, additional pipe engaging members 51 and 52 each elongated and of the same uniform thickness. Members 51 and 52 have surfaces 53 and 54 respectively disposed at an angle to each other transversely of arm 11. Also, surfaces 53 and 54 each slope toward predetermined path 2 in a direction toward outlet end 7 of aligning device 4. In addition to being conveniently replaceable, members 51 and 52 are advantageously formed of hard wear-resistant material such as heat-treated steel.

Arm 12 has a V-shaped recess 55 identical to recess 50 of arm 11, recess 55 facing toward path 2. Mounted in recess 55 are elongated additional pipe engaging members 56 and 57 with surfaces 58 and 59, respectively. Surfaces 58 and 59 are at an angle to each other and slope toward predetermined path 2 in a direction toward outlet 7 of aligning device 4. Each of members 51, 52, 56 and 57 has a short portion 59' which extends beyond and is thus unsupported by the respective surfaces of V-shaped recesses 50 and 55.

Roller 9 is identical to roller 10. As shown at FIG. 1, with regard to roller 9, the rollers each have a V-grooved pipe engaging peripheral portion 60, which is preferably resilient, surrounding a rigid cylindrical sleeve portion 61. Antifriction bearings 62 are fitted in the opposite ends of sleeve portion 61. Roller 9 is mounted in recess 30 by passing axle 32 through the openings in antifriction bearings 62. Roller 10 is similarly mounted on arm 12 for rotation in recess 39 on axle 41. It will be observed with reference to FIG. 1 that the side faces of the recesses are closely adjacent the side faces of bearings 62 to maintain minimum side movement of the rollers while allowing free rotation of the rollers on their bearings.

As shown at FIGS. 2 and 3, arms 11 and 12 close sufficiently toward each other so that rollers 9 and 10 engage each other. The V-grooved periphery 60 of rollers 9 and 10 is seen at FIG. 3 to have surfaces which are at an angle to each other slightly smaller than the angle between surfaces 53 and 54 of additional object engaging members 51 and 52, and slightly smaller than the angle between surfaces 58 and 59 of additional object engaging members 56 and 57. It will be seen at FIG. 3 that the ends of the flap portions 59' of surfaces 53, 54, 58 and 59 are each spaced the same distance from predetermined path 2 (as measured perpendicularly from the surfaces to the path), and that this distance is slightly greater than the distance from predetermined path 2 to the several surfaces of V-grooved peripheries 60 of rollers 9 and 10. The reason for so locating the innermost portions of surfaces 53, 54, 58 and 59 slightly outwardly of the pipe engaging surfaces of rollers 9 and 10 is to cause arms 11 and 12 to swing apart, as the leading end of pipe 1 engages the surfaces 53, 54, 58 and 59, and correspondingly the rollers 9 and 10 move apart so that distance between the surfaces of the rollers, just before engagement by the pipe, is only slightly less than the diameter of the pipe.

As shown at FIGS. 1 and 2, connecting mechanisms 13 and 14 are located at opposite sides of the arms in the spaces between the sides of the arms and support plates 15 and 16, respectively. Connecting mechanisms 13 and 14 are identical and each connecting mechanism includes a relatively thick U-shaped connecting element 63 with spaced apart, parallel, longitudinally extending legs 64 and 65, and a pair of rigid connecting links. The ends of legs 64 and 65 have vertical recesses 66 and 67 therethrough. Connecting links 68 and 69 are each of the same effective length and each have inner ends which extend respectively into recesses 66 and 67 and are pivotally connected to connecting element 63 by pivot pins 70 and 71, respectively, which extend through and are fixed to legs 64 and 65 by retaining pins 72. The axes of pivot pins 70 and 71 are in a common plane perpendicular to predetermined path 2, are parallel with each other, and are equidistantly spaced on opposite sides of path 2. The outer ends of connecting links 68 and 69 are pivotally connected respectively to arms 11 and 12. The pivotal connection between arm 11 and connecting link 68 includes a shaft 73 which extends through an opening 74 (FIG. 3) extending transversely through the arm at the end thereof opposite roller 9. The outer end of connecting link 68 has a suitable opening into which the end of shaft 73 extends to pivotally connect the link to the arm. Shaft 73 also has a projecting threaded tip to receive a nut 75 to hold connecting link 68 on shaft 73. The outer end of connecting link 69 is similarly connected to a shaft 76 parallel with shaft 73 and which extends transversely through arm 12 and has a threaded tip to receive a nut 77 which holds the connecting link on shaft 76. The axes of shafts 73 and 76 are parallel to the axes of piovt pins 70 and 71 and lie in a common plane parallel with and spaced from the plane of the axes of pivot pins 70 and 71.

Connecting element 63 is constrained to substantially straight line movement in a direction parallel to predetermined path 2 by a guide bar 78 (FIG. 2) which extends through an opening 79 in the connecting element. Guide bar 78 is elongated and has a cylindrical guide surface 79'. One end of the guide bar is fixed to support 8 by extending the end into an opening 80 of mounting block 21 and fixing the end in the opening with a suitable retaining pin. The other end of guide bar 78 has threads 81 to threadedly receive an adjusting sleeve 82, with internal threads 83, on the end of the guide bar. Threads 83 advantageously include a nylon insert (not shown) which locks the sleeve in the adjusted position on bar 78 to which it is manually set. Sleeve 82 extends through an opening 84 in mounting block 19. The sleeve is a sliding fit in opening 84 to provide support for the threaded end of guide bar 78 while permitting sleeve 82 to be easily rotated. Sleeve 82 has a transverse annular end face 85 which faces toward a flat vertical end surface 86 of connecting element 63. End surface 86 faces toward and engages a flat vertical surface 87 of mounting block 19 when sleeve 82 is adjusted to the position of FIG. 2.

Connecting element 63 is normally urged toward surface 87 by the action of a helically wound compression spring 88 disposed on guide bar 78. One end of spring 88 engages a vertical face of mounting block 21 which provides a spring seat 89 which faces in the same direction as end surface 86 of the connecting element. The other end of spring 88 engages a flat vertical face 90 of connecting member 63 which is parallel to end surface 86 but faces toward spring seat 89.

With reference to FIG. 2, it will be noted that the axes of openings 79, 80 and 84 are colinear, are aligned with the axis of cylindrical guide surface 79' of guide bar 78, and that all thse axes lie in a common horizontal plane passing through predetermined path 2.

Connecting mechanism 13 is identical to connecting mechanism 14 and will hence not be described in detail. It will, however, be apparent with reference to FIGS. 1 and 2 that connecting mechanism 13 is carried by mounting blocks 18 and 20 in the manner described for connecting mechanism 13, that connecting mechanisms 13 and 14 have their several identical parts precisely aligned transversely of predetermined path 2, and that corresponding elements of the connecting mechanisms move in unison as arms 11 and 12 pivot.

The function of connecting mechanisms 13 and 14 is to move arms 11 and 12 simultaneoulsly toward and away from predetermined path 2 so that the V-grooved peripheral pipe engaging surfaces 60 of rollers 9 and 10 are always spaced the same distance from predetermined path 2. In addition, since the surfaces 53 and 54 are fixed to arm 11 and surfaces 58 and 59 are fixed to arm 12, these surfaces are also maintained the same distance from predetermined path 2 throughout the operating range of pivotal movement of the arms.

OPERATION

The action of connecting mechanisms 13 and 14 is best understood with reference to FIGS. 2 and 4 which shows connecting mechanism 14. Assume for purposes of explanation, that a force is applied to arm 11 to pivot the arm clockwise about pivot pins 43. Clockwise movement of arm 11 causes shaft 73 to pivot with the arm about pivot pins 43. Shaft 73 exerts a pull on connecting element 63, via link 68, which acts along a line joining the centers of shaft 73 and pivot pin 70. However, since connecting element 63 is constrained to rectilinear movement along guide bar 78, only the horizontal component of the force resulting from pivotal movement of arm 11 acts to move connecting elements 63. The force exerted on connecting element 63 moves the connecting member to the right, as seen at FIG. 4, in opposition to the action of compression spring 88. However, as connecting element 63 moves to the right a force is exerted by the connecting element on arm 12 via pivot pin 71, rigid link 69, and shaft 76 which causes arm 12 to pivot simultaneously with arm 11 but in a counter clockwise direction. Connecting mechanism 13 functions in a manner identical to connecting mechanism 14 and operates simultaneously therewith.

As previously described, a pipe 1 is propelled along conveyor 5 toward inlet end 6 of aligning apparatus 4. First consider the case where pipe 1 enters the aligning device with its axis in precise alignment with predetermined path 2. When leading end 95 of pipe 1 reaches the position shown at FIGS. 1–3, this leading end simultaneously engages surfaces 53, 54, 58 and 59, and simultaneously moves arms 11 and 12 apart in opposition to the action of springs 88. When pipe 1 passes flap portions 59' of surfaces 53, 54, 58 and 59 rollers 9 and 10 are spread apart a distance such that the V-grooved peripheries 60 have a space therebetween which is slightly less than the diameter of pipe 1. Then, as the pipe proceeds further, leading end 95 engages the grooved peripheries 60 of the rollers and forces the rollers and arms apart a slight additional distance, to the positions of FIGS. 4 and 5. It will be observed with reference to FIG. 5 that when rollers 9 and 10 are in engagement with the surface of pipe 1, all portions of surfaces 53, 54, 58 and 59 are spaced radially outwardly of the surface of the pipe. As a result of the spreading of arms 11 and 12 as pipe 1 passes through aligning device 4, the connecting elements 63 of both connecting mechanisms 13 and 14 are pulled by links 68 and 69, in the manner previously described, in opposition to the action of spring 88 to the position of FIG. 4 in which end face 86 is spaced from face 87.

Now consider the case where a badly misaligned pipe enters aligning device 4 from conveyor 5. Assume, for purposes of illustration, that the axis of pipe 1 is misaligned so that the leading end 95 of the pipe is above the proper aligned position shown at FIG. 4. As leading end 95 of pipe 1 enters the aligning device it engages additional surfaces 53 and 54 with the result that a force is exerted on arm 11 tending to move the arm clockwise, against the action of spring 88, while simultaneously a force is exerted on the pipe tending to move the pipe toward alignment with predetermined path 2. The force acting on arm 11 will pivot the arm in a clockwise direction thereby moving surfaces 53 and 54 outwardly to allow the misaligned pipe to pass through the aligning device. Since arm 12 moves simultaneously with arm 11, in the manner previously described, additional surfaces 58 and 59 are immediately spaced the same distance from predetermined path 2 as surfaces 53 and 54 and do not engage the misaligned pipe. Since the pipe engages only surfaces 53 and 54, the entire force of spring 88 of each connecting mechanism acts to move the pipe into alignment with predetermined path 2. As pipe 1 proceeds through aligning device 4, the pipe passes between rollers 9 and 10. If the pipe is still misaligned so that the leading end of the pipe is above its proper aligned position, only roller 9 will engage the surface of the pipe, and again, the entire force of springs 88 is exerted on the pipe by roller 9 to move the pipe into alignment with predetermined path 2. There is thus no opposition to alignment of the pipe by either addition surfaces 58 and 59 of arm 12 when the leading end of the pipe is between the recesses 50 and 55 and there is also no opposition from roller 10 to alignment of the pipe by roller 9. As shown in FIGS. 4 and 5, the rollers 9 and 10 simultaneously engage the pipe only when the pipe is precisely aligned.

A horizontally misaligned pipe will be forced toward predetermined path 2 by the component force resulting from engagement of the pipe by, for example, surfaces 54 and 59 if the pipe is misaligned to the left of the centered position shown at FIG. 3. The V-grooved peripheries 60 of rollers 9 and 10 function in the usual manner to align a horizontally misaligned pipe.

Now consider the action of adjusting sleeve 82 which may be adjusted to space arms 11 and 12 and correspondingly rollers 9 and 10, each the same distance from predetermined path 2. Whereas FIGS. 2 and 4 show the adjusting sleeve 82 of connecting mechanism 14 in its retracted position wherein annular surface 85 is to the left of face 87 and hence, is not engaged by end surface 86 of connecting member 63, adjusting sleeve 82 can be manually threaded to the right to the position shown at FIG. 6 where annular surface 85 engages end surface 86 of connecting member 63 to maintain arms 11 and 12 in spaced relation to each other so that the distance between the pipe engaging portions of rollers 9 and 10 is only slightly less than the diameter of the pipe. The adjusting sleeves 82 of both connecting mechanisms 13 and 14 are, of course, adjusted simultaneously. As is apparent with reference to FIG. 6 and in view of the previous explanation of the operation of connecting mechanisms 13 and 14, movement of connecting element 63 to the right by adjusting sleeve 82 causes arms 11 and 12 to move the same distance away from predetermined path 2. Correspondingly, additional surfaces 53, 54, 58 and 59 are moved away from predetermined path 2. It is to be appreciated that the annular surface 85 of sleeve 82 funcions as a stop to limit the extend of inward travel of the arms toward predetermined path 2. By so adjusting the arms, wear of the several pipe engaging surfaces of the aligning device, as well as the various pivots of the aligning device, is substantially reduced. Advantageously, manipulation of adjusting sleeves 82 to limit the extent of inward travel of arms 11 and 12 is accomplished by further compressing spring 88 of both connecting mechanisms 13 and 14, and hence, the forces exerted by the springs to align a misaligned pipe are of the same magnitude when the adjusting sleeve is properly adjusted as when the sleeve is retracted.

In view of the foregoing, it is apparent that the connecting mechanisms maintain the axes of axles 32 and 41, about which rollers 9 and 10 rotate, in a common plane perpendicular to path 2 and equidistantly spaced from the path, throughout the operative range of movement of the arms. The additional pipe engaging surfaces 53, 54, 58 and 59 are located between the rollers and the pivotal axis of the arms.

Although a preferred embodiment of aligning device has been shown and described as employed to align a pipe for movement along a predetermined horizontal path, it is to be understood that the orientation of the device and the horizontal direction of travel of the pipe after alignment are illustrative only and that aligning device 4 can be used with equal advantage to align pipe regardless of the directional orientation of the predetermined path, be it horizontal, vertical or some other direction.

In addition, although arms 11 and 12 are, in the preferred embodiment, mounted to pivot about the same axis, the operation of aligning device is the same where the pivotal axes of arms 11 and 12 are parallel, are equidistantly spaced respectively above and below predetermined path 2, and lie in a common plane perpendicular to predetermined path 2.

ALTERNATIVE EMBODIMENT

The device of FIGS. 1–6 operates quite satisfactorily to accurately align elongated members such as pipes and rods entering nondestructive testing apparatus. It has been found, however, that after extended use some wear developed between the guide bars 78 and the surrounding openings 79 in connecting elements 63 and 64. The sliding fits between the guide bars 78 and the openings 79 are relatively close fits because these members play an important role in assuring that arms 11 and 12 move in unison through equal distances as the rollers 9 and 10 open and close to engage a pipe, for example. These close fits cause the wear and may have a detrimental effect on the smoothness of operation of the aligning device. Another embodiment of the invention is illustrated in FIGS. 7–9 which eliminates the possibility that the above-described wearing will take place. In this alternative embodiment, the sliding fits between guide bars 78 and the connecting elements 63 and 64 are eliminated by doing away with the connecting elements and by extending the lengths of connecting links 68 and 69 on both sides of the aligning device so that the connecting links on each side pivot on a pin whose movement is determined by an arm that pivots about a point which is fixed with respect to the supporting structure of the aligning device. Thus, a free swinging pivot motion has been substituted for the previously-described sliding motion, and no deleterious wear occurs between members of the device.

In the following description of the alternative embodiment, members which are the same or substantially the same as in the device of FIGS. 1–6 will be designated by the same reference numerals as previously used, and members which have been slightly modified will be designated by primed numerals. Because the device is symmetrical about a vertical plane through path 2, as viewed in the front view of FIG. 8, the following description will deal mostly with the construction and operation of the component members on one side only, it being understood that the corresponding members on the other side of the vertical plane are constructed and operate in like manner.

Referring now in detail to FIGS. 7–9, the pipe engaging rollers 9, 10 and arms 11, 12 are unchanged from the illustrations of FIGS. 1–6 and function essentially the same way as described above. Similarly, the pipe engaging members 51, 52, and 56, 57 located at the inlet end 6, FIG. 8, are the same as previously described. As seen in FIGS. 7 and 8, arms 11 and 12 pivot with respect to each other about the two pivot pins 43′ and 43″ that are located on the two sides of the device. Pivot pins 43′ and 43″ are of smaller diameters at the inner ends and pivotally support the ears 27 and 28 at the end of arm 11 and the ears 36 and 37 at the end of arm 12. Pivot pin 43′ has an enlarged head 101 at its outer end, FIG. 8, which is fixedly secured as by the illustrated screws to fixed support plate 15, and pivot pin 43″ has the enlarged head 102 at its outer end which is fixedly secured in like manner to fixed support plate 16. Pivot pins 43′ and 43″ are axially aligned with each other, and a common axis through the two passes through the predetermined path 2, along which the pipe is to pass, and which is the axis of symmetry of the aligning device. Pivot pins 43′ and 43″ are equally spaced from the path 2. Near their outer ends, pivot pins 43′ and 43″ have respective bores 103 and 104 extending therethrough in directions parallel to path 2. Sliding shafts 106 and 107 are freely received within bores 103 and 104, as will be explained further below.

Referring to FIGS. 7 and 9, the respective rigid connecting links 68′ and 69′ are pivotally connected to the shafts 73 and 76 which pass through corner regions at the inlet end of arms 11 and 12, these connections being substantially similar to those illustrated in the first-described embodiment of FIGS. 1–6. Spacer washers 105 provide their obvious function on shafts 73 and 76.

Comparing FIGS. 2 and 7 it will be seen that connecting links 68′ and 69′ have been extended in length in this alternative embodiment and now pivotally engage pivot pin 110 whose axis is perpendicular to, and in the position illustrated in FIG. 7, intersects path 2. As seen in FIGS. 8 and 9, a forked pivot arm 112 has tines 113 and 114 which pivotally engage pivot pin 110. Pivot pin 110 has an enlarged head at its left end, as viewed in FIG. 9, and a pin 117 that extends through a boss 118 and pivot pin 110 keeps the various members 68′, 69′ and 112 in their respective locations on pivot pin 110. Forked pivot arm 112 extends upwardly from pivot pin 110 and pivotally engages the rod 121 which extends between, and is fixedly secured to, the support plates 15 and 16. A rigid support rod 121 extends between pivot arms 112, FIG. 8, and helps assure that the pivot rods on the two sides of the device operate in unison.

As clearly illustrated in the side view of FIG. 7, the round shaft 107 is secured to boss 118 and extends to the right through bore 104 of pivot pins 43″. Bore 104 is considerably larger in diameter than shaft 107 so as to permit a loose sliding fit of shaft within the bore. Compression spring 129 is positioned around shaft 107 and extends between the flat surface 130 of boss 118 and a washer 133 held against pivot pin 43′. Spring 129 exerts a force against the flat face 130 of boss 18, thereby tending to urge boss 118 and pivot pin 110 toward the left. This force acts through connecting links 68′ and 69′ to tend to pull arms 11 and 12, and thus rollers 9 and 10, toward path 2.

If it is desired to maintain rollers 9 and 10 in a spaced-apart relationship in the absence of a pipe 1 being located within the device, a screw 131, FIG. 7, which is threadably received within a block 132 secured to the supporting structure of the device, may be turned to advance it to the right until it engages the boss 118, thereby restricting the movement of boss 118 to the left, the boss being urged toward the left by spring 129.

In the operation of the aligning device just described, the pipe 1, FIG. 7, will enter inlet end 6 along path 2 and will strike the inclined surfaces of pipe engaging members 51, 52 and 56, 57, FIG. 8. Continued motion of pipe 1 to the left will cause arms 11 and 12 to part, each pivoting outwardly from path 2 about their common pivot pins 43′ and 43″. Pipe 1 next will contact rollers 9 and 10 and will cause the left ends of arms 11 and 12 to move further apart as the V-shaped portions of rollers 9 and 10 engage the outer surface of the pipe.

The outward pivoting of arms 11 and 12 to receive pipe 1 within rollers 9 and 10 causes the shafts 73 and 76 to move to the right, in FIG. 7, along arcuate paths whose centers of rotation are pivot pin 43″. The movement of shafts 73 and 76 to the right causes the pivotally connected connecting links 68′ and 69′ also to be drawn toward the right. Since connecting links 68′ and 69′ are pivotally connected at their other ends to pivot pin 110, pin 110 and the tines 113 and 114 of forked pivot arm 112 also are drawn to the right. Because pivot arm 112 is pivoted at its upper end to the fixed pivot rod 121, the motion of pivot pin 110 is restricted to an arcuate path whose center is rod 121.

As in the embodiment of FIGS. 1–6, arms 11 and 12 always will move together and by equal distances toward or away from path 2 since the two arms are pivotally linked together through pivot pins 43′ and 43″, and through connecting links 68′ and 69′ and pivot shaft 110, for example. It is seen that when the arms 11 and 12 move outwardly from path 2 the movement of pivot rod 110 to the right, FIG. 7, is not purely rectilinear, but is along the arcuate path whose center is the pivot rod 121, as previously discussed. This will have an effect to cause the center of alignment of a pipe to shift slightly from the desired path 2. However, by providing a relatively long pivot arm 112 the movement of pivot rod 110 varies only slightly from a true rectilinear movement and introduces but a small and inconsequential error in the centering of the pipe about the desired center path 2.

The deviation from true rectilinear movement of pivot pin 110 during its movement to the right will be a function of the distance it moves along its arcuate path, which in turn is a function of the separation of the left ends of arms 11 and 12 that is required for rollers 9 and 12 to engage the surface of the pipe 1 or other cylindrical member being passed through the aligning device. I have found that with the use of a pivot arm 112 which is 5 inches long, and when rollers 9 and 10 are separated to positions that approximate the mid positions of their expected operating limits when inspecting oil well sucker rods, for example, whose diameters may vary from one-half inch to one and one-eighth inch, and with a centering device proportioned so that the distance between pivot pins 43″ and 110, FIG. 7, is approximately 3.58 inches, and the distance between a vertical line through the axles of rollers 9 and 10 and pivot pin 43″ is approximately 4.81 inches, then the deviation of the actual centering position between rollers 9 and 10 from the desired centering position along path 2 is only .00168 inch. A deviation of this magnitude is tolerable for most intended uses of the aligning device.

It is believed that the above explanation clearly reveals that it is the motion of pivot pin 110, at which connecting links 68′ and 69′ are pivotally connected, that determines the accuracy of the centering action provided by the device of this embodiment. As evidenced from the above example, the centering action is quite accurate despite the fact that pivot pin moves in a free swinging arcuate path defined by pivot arm 112 rather than along a true rectilinear path as in the embodiment of FIGS.

1–6. It also is believed to be evident that no wear will be experienced in the embodiment of FIGS. 7–9 as is the case with the embodiment of FIGS. 1–6. Although the rod 107, FIG. 7, does slide through bore 104 in pivot pin 43″, the fit between these members plays no role in the centering action, and as explained above, bore 104 is considerably oversized with respect to rod 107 so that no wear or binding will occur to impede the smoothness of operation of the device. The sole function of rod 107 is to support compression spring 129.

Referring to FIG. 7 it is seen that connecting links 68′ and 69′ are inclined to form an angle whose apex is further along the direction of path 2 than are the opposite ends of the connecting links. This arrangement provides for economy of space in the construction of the device. If desired, connecting links 68′ and 69′ could be inclined about the pivot shafts 73 and 76 so that they joined pivot pin 110 at a position in advance of inlet end 6, in which case pivot arm 112 and fixed pivot rod 121 also would have to be advanced in location. The operation of this arrangement of the device would be essentially the same as described.

While the preferred embodiments have been described as employed to align a pipe and the aligning device in its preferred embodiments have been described as including first and second rollers, it is also to be understood that other arrangements of rollers, for example, three rollers equally spaced apart circumferentially of path 2 and mounted on suitable arms can also be employed without departing from the scope of this invention. It is also to be understood that the aligning device can be used to align objects other than pipe, for example, bars of both cylindrical and square cross section as well as sheets or strip material in which instance, modification of the configuration of the rollers may be necessary. While preferred embodiments have been shown and described, it is to be understood that numerous changes, in addition to those suggested above, can be made.

I claim:

1. An aligning device for aligning a longitudinally traveling elongated object for movement along a predetermined path, and comprising:
   first and second object engaging means including at least first and second rollers;
   roller mounting arms including at least a first arm and a second arm;
   a support;
   first mounting means mounting:
      said first arm on said support for pivotal movement about a pivotal axis in a plane perpendicular to the predetermined path, and
      said second arm on said support for pivotal movement about a pivotal axis in said plane perpendicular to the predetermined path;
   said pivotal axes of said first and second arms being coincident, and said arms pivot in direct opposition to each other;
   second mounting means mounting:
      said first roller on said first arm for rotation about an axis spaced from said pivotal axis of said first arm by a predetermined distance, and
      said second roller on said second arm for rotation about an axis spaced from said pivotal axis of said second arm by said predetermined distance;
   connecting means interconnecting said first and second arms to simultaneously move said first and second rollers toward and away from said path with said rollers spaced the same distance from said path and aligned transversely of said path; and
   urging means to urge said first and second rollers toward said path and into engagement with the surface of an object to be aligned.

2. An aligning device according to claim 1 wherein:
   said aligning device has an inlet and an outlet;
   said first and second arms each extend longitudinally of said path;
   and which further includes:
      third object engaging means on said first arm at a location spaced from said first roller in a direction toward said inlet of said aligning device, and
      fourth object engaging means on said second arm at a location spaced from said second roller in a direction toward said inlet of said aligning device;
   said third and fourth object engaging means, for any operative position of said arms, each having portions thereof spaced from said predetermined path by a distance slightly greater than the distance of said rollers from said path;
   to enable an object entering said aligning device
      to first engage said object engaging means to move said arms away from said path of travel and to correspondingly move said rollers away from said path a distance slightly less than said object engaging means, and
      to subsequently engage said rollers.

3. An aligning device according to claim 2 wherein:
   said third and fourth object engaging means each include:
      surfaces which slope toward said path in a direction from the inlet to the outlet of the aligning device;
   whereby, said surfaces of said third and fourth object engaging means guide an object toward said rollers.

4. An aligning device according to claim 2 wherein:
   said first and second arms each have a width measured transversely of said path which is greater than the width of an object to be aligned;
   said arms are mounted for pivotal movement in direct opposition to each other;
   said third and fourth object engaging means each include:
      a surface of a recess in said first arm, and
      a surface of a recess in said second arm;
   each of said surfaces facing said predetermined path, said surfaces sloping toward each other in transversely aligned relation in a direction toward the outlet of the aligning device.

5. An aligning device according to claim 1 wherein:
   said connecting means comprises:
      a connecting element mounted on said support for movement parallel to said predetermined path,
      first and second links each having first portions connected to said connecting member for pivotal movement about axes each equidistant from said predetermined path and in a common first plane perpendicular to said path;
   said first and second links each having the same effective length and having second portions thereof pivotally connected respectively to said first and second arms at pivotal axes each equidistant from said predetermined path and in a common second plane perpendicular to said path and spaced from said first plane.

6. An aligning device according to claim 5 wherein:
   said aligning device further includes:
      an elongated guide, said guide being fixed to said support and presenting a surface in spaced parallel relation to said predetermined path;
   said connecting element has an opening therein of a size to receive said guide, and
   said guide extends into said connecting element opening to slidably mount said connecting element for movement along said surface of said guide.

7. An aligning device according to claim 6 wherein:
   said urging means
      is a helically wound compression spring which encircles said guide, one end of said spring engages a spring seat fixed to said support, and the other end of said spring engages said connecting element.

8. An aligning device according to claim 7 wherein:

said guide is a guide bar;

said guide bar extends through said opening of said connecting element and presents a threaded end;

said connecting element, adjacent said opening therein, has a surface facing in the same direction as said spring seat; and which further includes adjustable stop means to limit movement of said connecting element by said spring in a direction away from said spring seat, said stop means comprising:

a member threadably adjustable on said threaded end of said guide bar and engageable with said surface of said connecting element.

9. In a device for accurately aligning a traveling object for movement along a predetermined path, the combination comprising:

a first object engaging member;

a second object engaging member;

a support;

mounting means mounting said first object engaging member on said support at one side of the predetermined path of travel of the object for movement transversely toward and away from said path, and said second object engaging member on said support at another side of the predetermined path of travel of the object for movement transversely toward and away from said path in generally opposed relation to said first object engaging member;

said mounting means including a first mounting member and a second mounting member;

said first object engaging member being mounted on said first mounting member, and said second object engaging member being mounted on said second mounting member;

connecting means interconnecting said first and second mounting members for simultaneous movement toward and away from said predetermined path;

urging means operatively associated with said object engaging members to normally urge same toward said predetermined path and into engagement with the surface of an object passing through the device;

said first and second mounting members each being an arm that is elongated in a direction longitudinally of said predetermined path;

said arms each having a first portion, and a second portion spaced from said first portion longitudinally of said path;

said first portions of said arms being transversely aligned with each other and said second portions of said arms being transversely aligned with each other;

pivot means pivotally mounting said arms on said support at said first portions of said arms;

means mounting said object engaging members on said arms at said second portions of said arms; and additional object engaging members including at least a third object engaging member, and a fourth object engaging member;

said third and fourth object engaging members being mounted respectively on said first and second arms between said first and second portions thereof;

whereby, an object traveling through said device in a direction from said first portions to said second portions of said mounting members first passes said third and fourth object engaging members, and subsequently passes said first and second object engaging members.

10. In a device for accurately aligning a traveling object for movement along a predetermined path, the combination comprising:

a first object engaging member;

a second object engaging member;

a support;

mounting means mounting said first object engaging member on said support at one side of the predetermined path of travel of the object for movement transversely toward and away from said path, and said second object engaging member on said support at another side of the predetermined path of travel of the object for movement transversely toward and away from said path in generally opposed relation to said first object engaging member;

said mounting means including a first mounting member and a second mounting member;

said first object engaging member being mounted on said first mounting member, and said second object engaging member being mounted on said second mounting member;

connecting means interconnecting said first and second mounting members for simultaneous movement toward and away from said predetermined path;

urging means operatively associated with said object engaging members to normally urge same toward said predetermined path and into engagement with the surface of an object passing through the device;

said connecting means including:

a connecting element, and first and second links;

means mounting said connecting element on said support for movement parallel with said predetermined path;

said links having first portions connected to said connecting element at pivots in a common first plane perpendicular to said predetermined path, and second portions connected respectively to said first and second mounting members at pivots in a common second plane perpendicular to said predetermined path and spaced from said first plane.

11. A device according to claim 10 wherein:

said means operatively associated with said object engaging members to normally urge same toward said predetermined path is a spring, and said spring is connected between said support and said connecting element.

12. An aligning device for aligning a longitudinally traveling elongated object for movement along a predetermined path, said device comprising:

support means disposed transversely of said path for supporting the device at a fixed position along said path, a plurality of body members extending longitudinally and transversely of said path and located equidistantly from the path, pivot means joining said body members to an input end for permitting the body members to pivot with respect to each other about axes that lie in a plane that is transverse to said path, a plurality of object engaging members respectively attached to said body members at their ends opposite said pivot means and adapted to engage an elongated object moving along said path, said body members being adapted to permit a longitudinally traveling elongated object to pass therebetween at their input ends and to be engaged by said object engagaing members, a plurality of connecting elements located equidistantly from said path and extending parallel thereto, a plurality of elongated guide bars equal in number to the number of said connecting elements and extending parallel to said path, said guide bars being fixed to said support means and each one engaging a respective connecting element in a sliding contact that permits the connecting elements to slide thereon only in directions parallel to said path, a plurality of pairs of elongated rigid linkage means, each pair of linkage means being pivotally connected at one of their ends to a respective one of said connecting elements and each linkage means of a pair being pivotally connected at its other end to respective body members at locations thereon removed from said pivot means, whereby said connecting elements move in unison along their respective guide bars when a body member is moved toward or away from said path, and through the connection provided by said linkage means, said body members are caused to move in unison toward or away from the path, means including a plurality of springs each carried by a respective guide bar for urging the respective connecting element away from said input end, and through the operation of the linkage means, also urging said object engaging means with equal force toward said path.

13. An aligning device for aligning a longitudinally traveling elongated object for movement along a predetermined path, said device comprising:

support means disposed transversely of said path for supporting the device at a fixed position along said path, first and second body members extending parallel to and transversely of said path and located equidistantly on opposite sides of said path, pivot means joining said two body members at an input end for permitting the body members to pivot with respect to each other about an axis that is perpendicular to, and intersects, said path, first and second object engaging members respectively attached to said body members at their ends opposite the pivot means and adapted to engage an elongated object moving along said path, said body members being adapted to permit a longitudinally traveling elongated object to pass therebetween at their input ends and to be engaged by said object engaging members, first and second connecting elements equidistantly located on opposite sides of said path and each extending parallel to said path, first and second elongated guide bars extending parallel to said path and located equidistantly on opposite sides thereof, said guide bars being fixed to said support means and each one engaging a respective connecting element in a sliding contact that permits the connecting elements to slide thereon only in directions parallel to said path, first elongated rigid linkage means pivotally connected at one end to one body member at a location removed from said pivot means and pivotally connected at the other end to both of said connecting elements, second elongated rigid linkage means pivotally connected at one end to the other body member at locations removed from said pivot means and pivotally connected at the other end to both of said connecting elements, whereby said connecting elements move in unison along their respective guide bars when a body member is moved toward or away from said path, and through the connection provided by said linkage means, both body members are caused to move in unison toward or away from the path, means including first and second springs respectively carried by said guide bars for urging the respective connecting elements away from said input end, and through the operation of said linkage means also urging said object engaging means with equal force toward said path.

14. The combination claimed in claim 13 and further including:

adjustable stop means on said guide bars to limit the sliding motion of said connecting elements on said guide bars as urged by said springs, thereby equally limiting the movement of said object engaging members in a direction toward said path, whereby the object engaging members may be held in spaced apart relationship to receive and align an elongated object moving along said path.

15. The combination claimed in claim 13 and further including:

object contacting surfaces located on said body members near the input ends thereof, said contacting surfaces extending in the direction of travel of an elongated object along said path and located to contact an elongated object when the object engaging members are in their positions closest said path, said surfaces being inclined toward said path to contact the end of an elongated member entering the input end of the device and to cause said body members to be pivoted away from said path as said elongated object passes through the device, said springs acting through said connecting elements, said linkage means, said body members and said object engaging members to exert a force on a misaligned elongated object to urge the object into alignment with said path.

16. The combination claimed in claim 13 wherein:

said connecting elements are located beyond the input end of said body members in the direction of movement of the elongated object along the path, and are urged in said direction by said springs.

17. The combination claimed in claim 16 wherein:

said rigid linkage means are disposed at an oblique angle to said path to transfer to the connecting elements a rectilinear motion in the direction of said input end when a body member is moved away from said path.

18. An aligning device according to claim 1 wherein said connecting means comprises:

connecting links located to one side of said path and respectively pivotally connected at one of their ends to said arms at locations removed from the pivotal axes of the first and second arms and pivotally connected at their other ends to a pivot member that provides a pivot axis transverse to said predetermined path.

19. The aligning device according to claim 18 and further including:

a pivot arm pivotally connected at one end to said pivot member and at its other end to a pivot rod that is fixed with respect said support at a location transverse of said path.

20. An aligning device for aligning an elongated object for movement along a predetermined path, said device comprising:

a plurality of arms extending generally in the direction of said path and located equidistantly from the path, first pivot means joining said arms at an inlet end of the device for permitting the arms to pivot with respect to each other about axes that lie in a plane transverse to said path, support means for supporting said pivot means at fixed locations, a plurality of object engaging members respectively attached to said arms at their ends opposite said pivot means and adapted to engage an elongated object moving along said path, said arms being adapted to permit an elongated object to pass therebetween at said inlet ends and to be engaged by the object engaging members at the other end of the device, a plurality of pairs of elongated rigid connecting links, each pair of connecting links being pivotally connected at one of their ends to a respective one of said arms at locations removed from said first pivot means, second pivot means pivotally engaging the opposed ends of a respective pair of connecting links, said second pivot means being equally located transversely of said path and providing respective pivot axes that are transverse to said path, a plurality of pivot arms each pivotally engaging at one end a respective second pivot means and pivotally engaging at their other ends a rod that is fixed relative to said path, whereby said second pivot means are free to move in respective arcuate paths about a respective rod, and a plurality of spring means each having one end urging against means fixed with respect to said support means and having its other end urging a respective second pivot means in the direction away from the input end, whereby, through the operation of the connecting links, said object engaging means are urged toward said path.

21. The combination claimed in claim 20 and further including:

adjustable stop means fixed relative to said support means for limiting the movement of said second pivot means in their respective arcuate paths.

References Cited

UNITED STATES PATENTS

| | | | |
|---|---|---|---|
| 1,481,886 | 1/1924 | Berg | 226—177 X |
| 3,014,628 | 12/1961 | Littlehale | 226—177 |
| 3,310,210 | 3/1967 | Reib | 226—188 X |

ALLEN N. KNOWLES, Primary Examiner

U.S. Cl. X.R.

226—184, 187